United States Patent [19]
Walters

[11] 3,835,517
[45] Sept. 17, 1974

[54] BURNISHING TOOLS FOR INTERIOR AND EXTERIOR SURFACES
[75] Inventor: William D. Walters, Pontiac, Mich.
[73] Assignee: Cogsdill Tool Products, Inc., Farmington, Mich.
[22] Filed: Oct. 19, 1973
[21] Appl. No.: 408,165

[52] U.S. Cl. .................................................. 29/90
[51] Int. Cl. ........................................... B24b 39/00
[58] Field of Search ........................................ 29/90

[56] References Cited
UNITED STATES PATENTS
2,737,996 3/1956 Toth .................................. 29/90 X
2,843,918 7/1958 Koppelmann .......................... 29/90
3,130,477 4/1964 Gill ....................................... 29/90

Primary Examiner—Leonidas Vlachos

[57] ABSTRACT

Burnishing tools for finishing the inside or outside surface of a cylindrical workpiece to a high polish has a unique adjustment for changing the diameter of the annular plane of the rollers so as to change the diameter of the finished surface of the workpiece. This embodies the use of three pins against the ends of which the cage for the rollers is urged by a spring, the pins being positioned by a nut having an internal thread in engagement with the external thread sections on the facing side of the pins. An outer collar is fixed to the nut, the turning of which rotates the nut and advances or retracts the pins.

10 Claims, 6 Drawing Figures

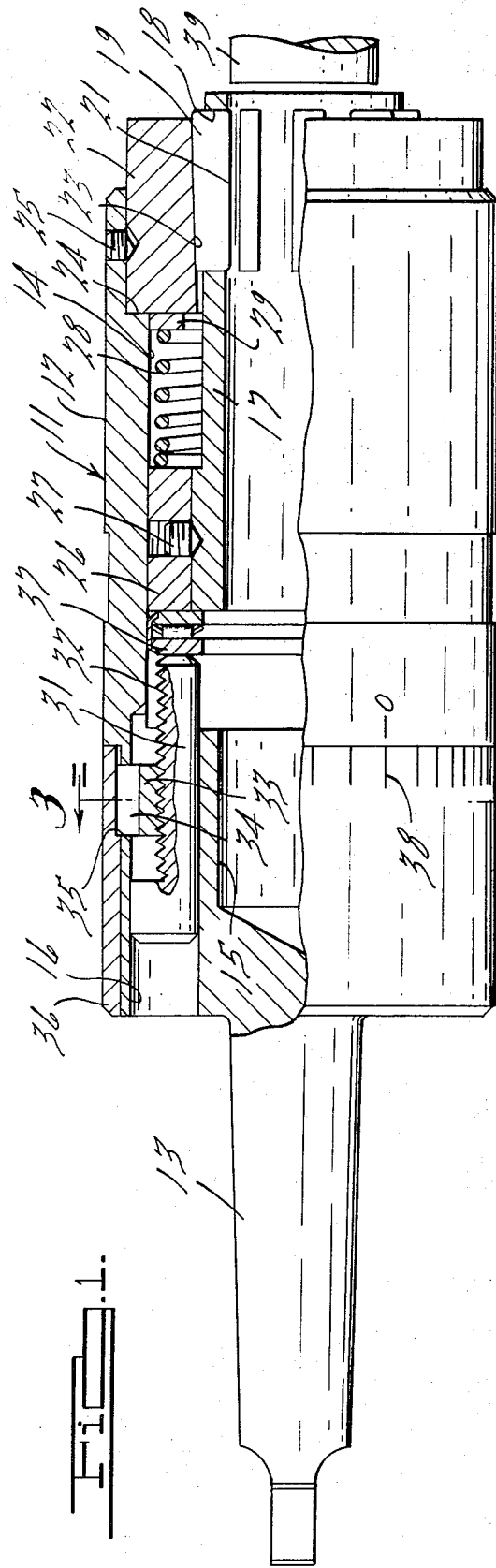

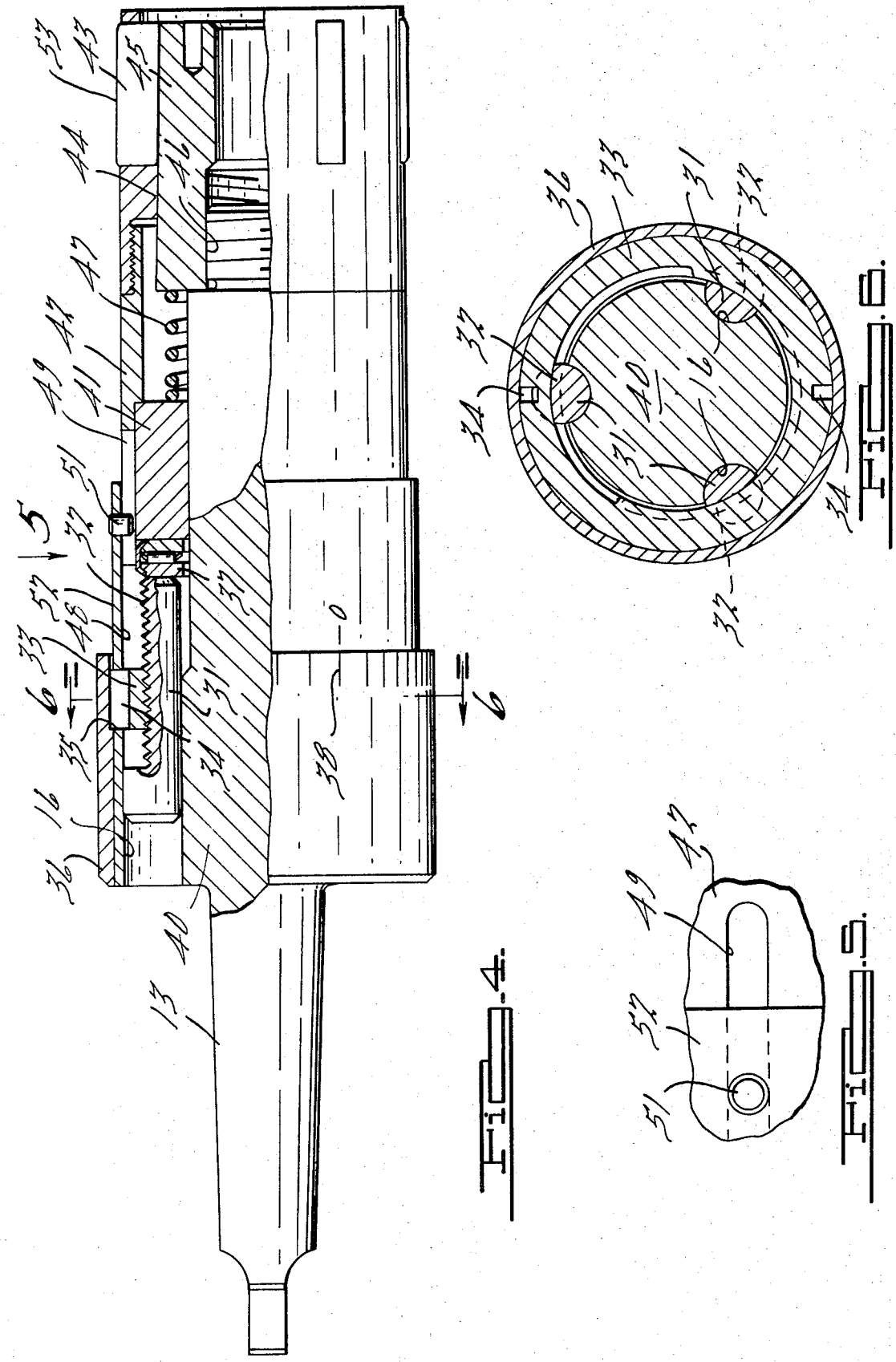

BURNISHING TOOLS FOR INTERIOR AND EXTERIOR SURFACES

BACKGROUND OF THE INVENTION

Reference may be had to the patent to S. E. Kalen, U.S. Pat. No. 3,626,560 to show a burnishing device which is capable of burnishing the outer surface, and that to C. A. Kruse in U.S. Pat. No. 3,656,333 for burnishing the inner surface, of a cylindrical element to compact the material and produce a high polish thereon.

SUMMARY OF THE INVENTION

The invention pertains to burnishing devices having a cylindrical body which has a cage and roller assembly at one end and provided with a driving shank at the other end. The roller cage is movable inwardly and outwardly to locate the rollers on a race having a truncated conical surface to thereby change the diameter of the lines of engagement of the truncated conical rollers with the inner or outer surface of a cylindrical workpiece. A thrust bearing at the end of the cage is engaged by the ends of three floating pins which have one side removed and provided with a section of a thread. The thread sections of the three pins are aligned on a helix and are engaged by the thread of a split nut. An annular slot is provided in the upper end of the body, in communication with the pins, in which the nut is disposed and a collar is press fitted onto the nut. The nut is adjusted through the rotation of the collar to advance or retract the pins to thereby position the thrust bearing against which the cage is maintained by a spring. This provides a simple adjustment for the truncated conical rollers which operate upon the inner or outer surface of a cylindrical workpiece.

BRIEF DESCRIPTION OF THE DRAWINGS

FIG. 1 is a broken sectional view of a burnishing tool for an external surface having adjusting means thereon embodying features of the present invention;

FIG. 2 is an end view of the structure illustrated in FIG. 1, taken at the lefthand end thereof;

FIG. 3 is a sectional view of the structure illustrated in FIG. 1, taken on the line 3—3 thereof;

FIG. 4 is a view of structure, similar to that illustrated in FIG. 1, for burnishing an internal surface of a workpiece;

FIG. 5 is a side view of the structure illustrated in FIG. 4, as viewed from the point 5 thereof, and FIG. 6 is a sectional view of the structure illustrated in FIG. 1, taken on the line 6—6 thereof.

DESCRIPTION OF THE PREFERRED EMBODIMENTS

Referring to FIGS. 1 to 3, the burnishing tool 11 comprises a cylindrical body 12 having a driving shank 13 at one end and a hollow cylindrical interior 14 at the other end. An inner cylindrical aperture 15 provides an outer area in which three cylindrical apertures 16 are provided which are equally spaced at an angle of 120° apart. A cage 17 has slots 18 therein for truncated conical rollers 19 which are prevented from passing therethrough by tapered sidewalls. The rollers have an internal engaging line 21 in parallel relation to each other and the axis of the tool body. The body 12 has a race 22 at the hollow end containing an internal truncated conical surface 23 with which the opposite line on the rollers 19 from the line 21 has longitudinal engagement. The race is retained against a shoulder 24 in the body end by a plurality of set screws 25. The inner portion of the cage has a retainer 26 secured on the outer side by set screws 27. A coil spring 28 is in engagement with the retainer 26 and a washer 29 which abuts the race 22 for urging the cage 17 inwardly. The retainer 26 is preferably made of bronze so as to readily slide upon the inner surface of the hollow interior of the body.

Three pins 31 are slideable mounted within the apertures 16 having their outer face cut away and provided with a thread section 32 which is in aligned helical relation to the three pins so as to be engaged by the thread of a nut 33. In order that the thread sections are always in alignment on the three pins, the ends are marked with the numerals 1, 2 and 3, as illustrated in FIG. 2. The end of the body adjacent to the openings are similarly marked so that the pins cannot be reversed to have the thread sections out of alignment. A fixture is provided in which the three pins are secured so that the side faces can be machined and a thread section applied to the machined faces of the three pins. In this manner, the thread sections of the three pins will fall on a continuous helix so that the nut can have its thread disposed in engagement therewith.

The nut 33 is of conventional form having an internal thread which mates with the threaded sections 32 of the pins. The nut has diametrical slots 34 cut into the outer wall so that the nut can be cracked and separated into two halves and placed in an annular slot 35 in the upper end of the body which cuts through the three apertures 16. This permits the two halves of the nut to be assembled on the thread of the pins with the cracked edges 30 in engagement. The nut is fixed against axial movement by the slot 35 and is secured to a collar 36 which is press fitted thereon in unit rotation therewith. The inner ends of the pins 31 engage a thrust bearing 37 of conventional form against which the cage 17 and retainer 26 abut. Through the turning of the collar 36 the amount of which can be checked by the divisions 38, the pins 31 will be moved inwardly or outwardly to adjust the position of the thrust bearing 37. This adjusts the position of the race 26 and cage 17 which is maintained against the thrust bearing by the spring 28. The lines of engagement 21 on the truncated conical rollers 19 fall on a diameter of a cylinder which may be enlarged or reduced by the turning of the collar 36 in one or the other direction. A cylindrical workpiece 39 is illustrated at the righthand end of the tool ready to be inserted between the rollers which if disposed at a slight angle will draw the workpiece into and beyond the rollers when the tool is driven in rotation. In view of the hollow interior of the body, a workpiece of substantial length may be burnished to approximate size with a bright finish and with the surface metal cold worked to have a degree of increased hardness.

Referring to FIGS. 4 to 6 inclusive, the same adjusting mechanism is illustrated applied to a tool which burnishes interior cylindrical surfaces. The structure from the roller thrust bearing 37 to the left including the driving shank 13 is substantially the same as that illustrated in FIGS. 1 to 3, the body portion 40 being solid and extended toward the front end of the tool. The body portion 40 has the three apertures 16 at the shank end for the pins 31 which are advanced or retracted by the nut 33 when turned by the collar 36 which is fixed thereto. The body 40 has a bronze ring 41 slideable thereon and secured to the inner surface of a cage 42 which supports a plurality of truncated conical rollers 43 at the forward end of the tool. These rollers engage a truncated conical surface 44 on a race 45 which is secured to the body 40 by a thread engagement 46. A spring 47 is disposed between the inner end of race 45 and the outer end of the ring 44 for urging the ring against the thrust bearing 37. An annular recess 48 is cut into the lefthand end of the body 40 in which the ends of the pins 31 engage the thrust bearing 37 to position the ring 41 and therefore the truncated conical rollers 43 relative to the sloping face 44 of the race 45. The cage 42 is provided with a slot 49 into which a pin 51, supported on the wall section 52 of the body, extends to prevent the relative rotation from occurring between the cage 42 and the body 40. It will be noted in this arrangement that the lines 53, which are radially disposed from the body on the outer face of the truncated conical rollers 43, are parallel to each other and also to the axis of the body 40. This permits the lines 53 of the rollers to be rolled on the inner surface of the workpiece as it is relatively advanced along the tool body to burnish the inner surface thereof with a bright finish and with an accurate inner cylindrical surface.

I claim:

1. In a burnishing tool, a body having a roller supporting end and a shank end, a race at the roller end of the body having a truncated conical surface, a plurality of truncated conical rollers, a cage having slots for supporting said rollers against the truncated conical surface of said race, a plurality of cylindrical apertures in the shank end of the body with the axis thereof disposed parallel to each other and to the axis of the body, slideable pins in each said aperture, said pins having a side cut therefrom and provided with an outwardly directed thread section which falls on a thread helix, and a nut in engagement with the thread sections of the pins for advancing the pins toward and from the race when the nut is turned in one or the other direction.

2. In a burnishing tool as recited in claim 1, wherein a thrust bearing is disposed between the inner ends of the pins and the adjacent end of the cage.

3. In a burnishing tool as recited in claim 2, wherein a spring is employed for advancing the cage against the thrust bearing.

4. In a burnishing tool as recited in claim 1, wherein a bronze sleeve is secured to the inner end of the cage in engagement with said spring.

5. In a burnishing tool as recited in claim 1, wherein the shank end of the body has an annular slot thereabout which intersects the pin apertures and wherein said nut is supported against movement longitudinally of the body.

6. In a burnishing tool as recited in claim 5, wherein said nut is cracked across a diameter and placed within said annular slot with its thread in engagement with the thread sections of the pins.

7. In a burnishing tool as recited in claim 6, wherein a collar is press fitted over the assembled nut for rotating the nut while being maintained against longitudinal movement thereby.

8. In a burnishing tool as recited in claim 7, wherein the ends of the pins are marked and the end of the body adjacent to the shank is also marked for locating the pins to have the thread of the sections fall upon a helix.

9. In a burnishing tool as recited in claim 1, wherein the roller supporting end of the body is hollow, and wherein the body at the roller end fixedly supports a race having an inner truncated conical surface, and wherein the cage slides within the hollow interior of the body to adjust the diameter to which the truncated conical rollers will burnish the outer cylindrical surface of a workpiece.

10. In a burnishing tool as recited in claim 1, wherein the roller supporting end has a central body portion extending from the shank end onto which the race is threaded to provide a fixed outer surface of truncated conical section, and wherein the cage is disposed outwardly of the solid body to be moved therealong to position the truncated conical rollers on the truncated conical surface of the race to produce a desired diameter which will be burnished on the inner surface of a workpiece with a high polish.

* * * * *